(12) United States Patent
Elrom et al.

(10) Patent No.: US 8,140,537 B2
(45) Date of Patent: Mar. 20, 2012

(54) BLOCK LEVEL TAGGING WITH FILE LEVEL INFORMATION

(75) Inventors: Ofer Elrom, Haifa (IL); Eran Raichstein, Haifa (IL); Gregory J. Tevis, Tucson, AZ (US); Oren Wolf, Bedford, MA (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 12/506,512

(22) Filed: Jul. 21, 2009

(65) Prior Publication Data

US 2011/0022601 A1    Jan. 27, 2011

(51) Int. Cl.
   *G06F 7/00* (2006.01)
(52) U.S. Cl. .......................... 707/747; 707/741; 707/745
(58) Field of Classification Search .................. 707/747, 707/741, 745
   See application file for complete search history.

(56) References Cited

U.S. PATENT DOCUMENTS

| 6,529,916 | B2 | 3/2003 | Bergman et al. |
| 7,174,352 | B2 | 2/2007 | Kleiman et al. |
| 7,337,278 | B2 | 2/2008 | Franaszek et al. |
| 2006/0294299 | A1 | 12/2006 | Edirisooriya |
| 2008/0091744 | A1 | 4/2008 | Shitomi et al. |
| 2010/0042790 | A1* | 2/2010 | Mondal et al. ................. 711/161 |
| 2010/0088296 | A1* | 4/2010 | Periyagaram et al. ........ 707/705 |

* cited by examiner

*Primary Examiner* — Apu Mofiz
*Assistant Examiner* — Cindy Nguyen
(74) *Attorney, Agent, or Firm* — Griffiths & Seaton PLLC

(57) ABSTRACT

Embodiments for data tagging in a computing environment are provided. A write operation in an operating system (OS) file system level storage layer is intercepted. A set of signatures in a sub-chunk level is calculated. The set of signatures are aligned to the beginning of an OS file system-level object and stored in a memory location, such as a cache, along with file system information relating to the write operation and to the file system-level object that the data is written into. Following file system processing, and as the data is written into storage in blocks, the write operation is intercepted in the block level storage layer. A secondary set of signatures in a sub-block level is calculated using a common algorithm used to create the original set of signatures. The sets of signatures are compared against each other, and blocks of the data having matching signatures are tagged with the file system information stored in the memory location.

20 Claims, 6 Drawing Sheets

BLOCK LEVEL TAGGING WITH FILE LEVEL INFORMATION

BACKGROUND OF THE INVENTION

1. Field of the Invention

The present invention relates in general to computers, and more particularly to a method, system, and computer program product for tagging file level information to block level data.

2. Description of the Related Art

In computing, a file system is a mechanism for storing and organizing computer files and the data they contain to simplify the process of data location and access. File systems may use one or more data storage devices, such as several devices organized into a data storage system. More formally, a file system is a special-purpose database for the storage, organization, manipulation, and retrieval of data.

One of the challenges in modern storage and data systems is a divergence between how data is represented to users and applications, such as by files and database records, and how data is actually stored on physical storage media, such as blocks or chunks of data. Many efficiencies that are possible when managing blocks of data (e.g., bulk transfers, de-duplication processing, image replication, etc.) are limited when managing data in their representative form as files, database records and the like. There is a need to improve the means by which data can be managed as blocks and yet maintain efficient reference information to the representative forms of that data.

One prior art mechanism that attempts to address some of the aspects of this challenge is the development of indexes that represent blocks of data. These indexes can be used in block level management as well as for higher level activities such as the compare and match processes of data de-duplication, block level searches, encryption, and others. However, the current state of the art, in view of today's large storage capacities and file sizes, result in the creation of very large indexes referencing to a large number of very small blocks of storage data. Management of such a large index may introduce unwanted inefficiencies and complexities.

SUMMARY OF THE INVENTION

In view of the foregoing, there is a need to introduce an effective and efficient block level index that represents the data in storage and data subsystems. There is further need for more efficient mapping of data blocks to the objects those data blocks represent (e.g., files, database records and the like). Accordingly, various embodiments for tagging blocks of data with file or database record level information are provided. These embodiments allow for more efficient management of file or database objects by exploiting block based management processes.

In one such embodiment, by way of example only, a write operation in an operating system (OS) file system level storage layer is intercepted. A set of signatures in a sub-chunk level is calculated. The set of signatures are aligned to the beginning of an OS file system-level object and stored in a memory location, such as a cache, along with file system information relating to the write operation and to the file system-level object that the data is written into. Following file system processing, and as the data is written into storage in blocks, the write operation is intercepted in the block level storage layer. A secondary set of signatures in a sub-block level is calculated using a common algorithm used to create the original set of signatures. The sets of signatures are compared against each other, and blocks of the data having matching signatures are tagged with the file system information stored in the memory location.

Related system and computer program product embodiments are also disclosed and provide additional advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1A:
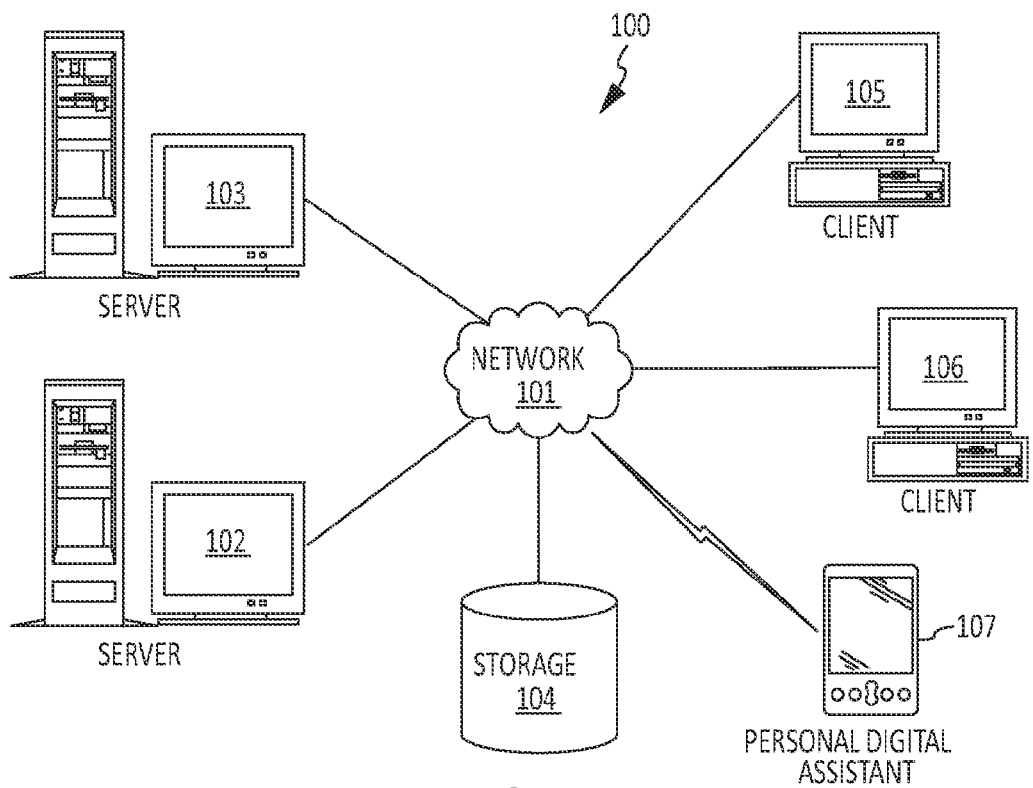
FIG. 1A depicts an exemplary data processing system in which the present invention may be implemented.

The illustrated embodiments described below present exemplary mechanisms for associating small portions of data, or "blocks" with higher level information. This higher-level information includes so-called "file-level" or "database record" information describing, for example, file and folder information in a file system. Associating, or "tagging" these small blocks of data with the higher-level information provides for more efficient management of the blocks of data by applications in the computing environment that may use this data.

Tagging blocks of data with file-level information allows for the creation of a data index relating the file-level information with the blocks of data. This data index allows for more rapid search and retrieval of information from the data blocks, among other benefits. The more rapid search and retrieval functionality in turn serves to increase the overall performance of the computing environment.

Accordingly, in light of the foregoing, the illustrated embodiments allow for tagging blocks of data with file or database record level information in order to more efficiently management file or database objects by exploiting block-based management processes. These mechanisms facilitate the creation of an effective block level index for use by such entities as applications that can make use of block level information as well as additional file level information relating to the block level information. By having additional file level information tagged to each storage block, the indexing process (or any other relevant application) is able to index the data in an efficient way by utilizing the fact that that several blocks are related to a common object (typically a file) and that there is a known order in the creation of the common object.

In contrast to the illustrated embodiment, a typical approach has been the creation of a multilayer indexing mechanism, including a high-level file system object level indexing mechanism, where each file object node includes a link to a list of signatures of all the blocks that represent the file object. A similar mechanism may be created in database management systems by tagging block level information with table, record, and other database objects. The challenge in tagging blocks with file system and database information increases further when resiliency of the indexing mechanism is desired (a typical situation), and when the sizes of storage and data systems grow larger. These situations generally require increased performance from the indexed block level information.

In order to satisfy the performance requirements from the indexing system, an effective index hardening mechanism should be introduced. Such a mechanism should aim for sequential write process to the storage subsystem rather than random access writes (generally much slower) that will result in poor performance from the index system. In a multilayer indexing approach as stated above, where the upper layers are large gathering objects (e.g., directories and files) and the lower layers are more granular objects (e.g., blocks or database records), it is possible to gather the lower layers index entries (e.g., blocks) and reference each of the entries in the context of the upper layers (again, e.g., directories and files) and thereby maintain sequential access to their representation in the index, both in memory and on disk. This gathering of lower layer index entries and reference to each of the entries in the upper layers provides increased write (and read) performance of the indexing system.

The exemplary data tagging mechanisms described, following, provide an infrastructure for the creation of applications and processes that are more effective, and utilize knowledge that was not previously available in the block level layer. The exemplary mechanisms incorporate a file level filter driver and a block (or disk) level filter driver operational on the operating system (OS) kernel level, performing mutual operations to achieve block level tagging of write operations performed by a file system or database. These mechanisms do not require specific application interfaces or specific knowledge of any particular file system, database, volume manager or other storage layers. In other words, the mechanisms promote cross-platform compatibility using a generic file system.

Finally, the mechanisms selectively process individual write and/or read input/output (I/O) operations with data tagging processing contingent on whether the particular I/O being processed at any one time is part of an entity using data tagging techniques. Such functionality promotes efficiency and effective resource allocation in the computing environment, as other I/O operations not relevant to the data tagging techniques are processed as normal. Since the mechanisms do not enforce the type of tagging information that might be used for various procedures, a number of tagging characteristics may be kept with every block referenced, such as the object or record name, last modified date, creation date, object or record size, and the like. The tagging information might also include information on the write process, including the writer process ID/thread ID, offset of the write in the file, size of the file system write operation, and alignment of the write operation.

With reference now to the figures, FIG. 1A depicts a typical data processing system computing environment in which the present invention may be implemented. Data processing system 100 contains network 101, which is the medium used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 may be a variety of computing devices, such as personal computers, personal digital assistants (PDAs), etc.

Distributed data processing system 100 may include additional servers, clients, and other devices not shown. In the depicted example, distributed data processing system 100 may include the Internet with network 101 representing a worldwide collection of networks and gateways that use the TCP/IP suite of protocols to communicate with one another. Of course, distributed data processing system 100 may also be configured to include a number of different types of networks, such as, for example, an intranet, a local area network (LAN), or a wide area network (WAN). FIG. 1A is intended as an example of a heterogeneous computing environment and not as an architectural limitation for the present invention. The present invention could be implemented on a variety of hardware platforms, such as server 102 or client 107 shown in FIG. 1A.

Figure 1C:
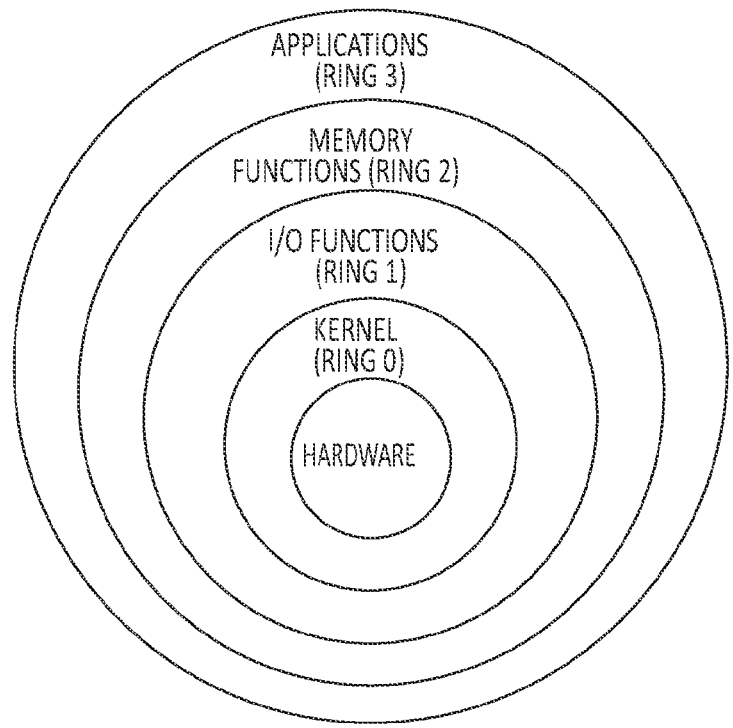
FIG. 1C depicts an exemplary software components within a computer system illustrating a logical relationship between the components as functional layers of software.
Figure 1B:
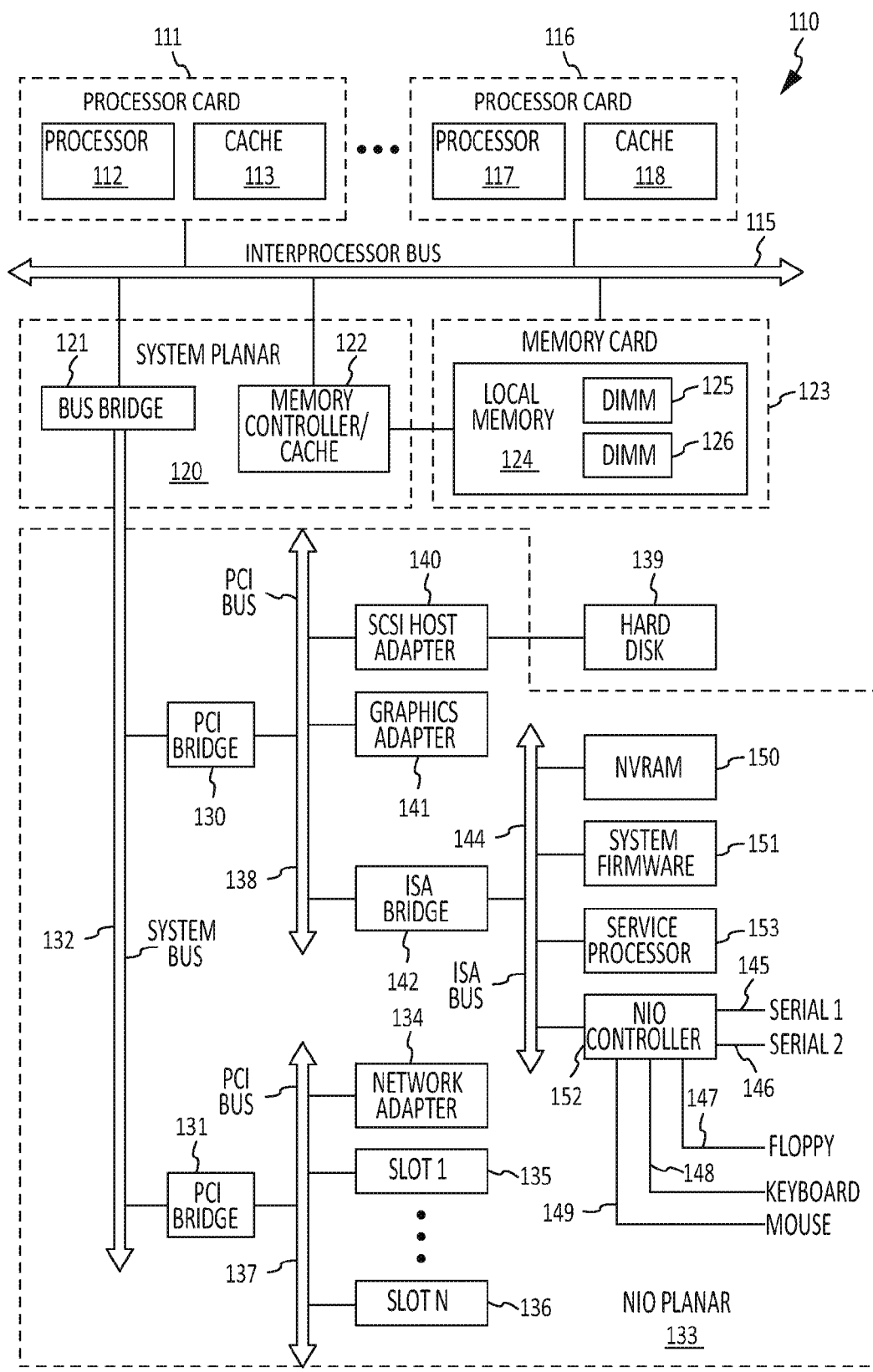
FIG. 1B depicts an exemplary computer architecture that may be used within a client or server in which the present invention may be implemented.

With reference now to FIG. 1B, a diagram depicts a typical computer architecture that may be used within a client or server, such as those shown in FIG. 1A, in which the present invention may be implemented. Data processing system 110 employs a variety of bus structures and protocols. Processor card 111 contains processor 112 and level two (L2) cache 113 that are connected to interprocessor bus 115. System 110 may contain a plurality of processor cards; processor card 116 contains processor 117 and L2 cache 118. Interprocessor bus 115 supports system planar 120 that contains bus bridge 121 and memory controller 122 that supports memory card 123. Memory card 123 contains local memory 124 consisting of a plurality of dual in-line memory modules (DIMMs) 125 and 126.

Interprocessor bridge 121 connects to PCI bridges 130 and 131 via system bus 132. PCI bridges 130 and 131 are contained on native I/O (NIO) planar 133 which supports a variety of I/O components and interfaces. PCI bridge 131 provides connections for external data streams through network adapter 134 and a number of card slots 135-136 via PCI bus 137. PCI bridge 130 connects a variety of I/O devices via PCI bus 138. Hard disk 139 may be connected to SCSI host adapter 140, which is connected to PCI bus 138. Graphics adapter 141 may also be connected to PCI bus 138 as depicted, either directly or indirectly.

ISA bridge 142 connects to PCI bridge 130 via PCI bus 138. ISA bridge 142 provides interconnection capabilities through NIO controller 152 via ISA bus 144, such as serial connections 145 and 146. Floppy drive connection 147 provides removable storage. Keyboard connection 148 and mouse connection 149 allow data processing system 110 to accept input data from a user.

Non-volatile RAM (NVRAM) 150 provides non-volatile memory for preserving certain types of data from system disruptions or system failures, such as power supply problems. System firmware 151 is also connected to ISA bus 144 and controls the initial BIOS. Service processor 153 is connected to ISA bus 144 and provides functionality for system diagnostics or system servicing.

Those of ordinary skill in the art will appreciate that the hardware in FIG. 1B may vary depending on the system implementation. For example, the system may have one or more processors, and other peripheral devices may be used in addition to or in place of the hardware depicted in FIG. 1B. The depicted examples are not meant to imply architectural limitations with respect to the present invention.

With reference now to FIG. 1C, an exemplary diagram shows software components within a computer system illustrating a logical relationship between the components as functional layers of software. The kernel (Ring 0) of the operating system provides a core set of functions that acts as an interface to the hardware. I/O functions and drivers can be viewed as resident in Ring 1, while memory management and memory-related functions are resident in Ring 2. User applications and other programs (Ring 3) access the functions in the other layers to perform general data processing. Rings 0-2, as a whole, may be viewed as the operating system of a particular device. Assuming that the operating system is extensible, software drivers may be added to the operating system to support various additional functions required by user applications, such as device drivers for support of new devices added to the system.

In addition to being able to be implemented on a variety of hardware platforms, the present invention may be implemented in a variety of software environments. A typical operating system (OS) may be used to control program execution within each data processing system. For example, one device may run a Linux® operating system, while another device may run an AIX® operating system.

Figure 1D:
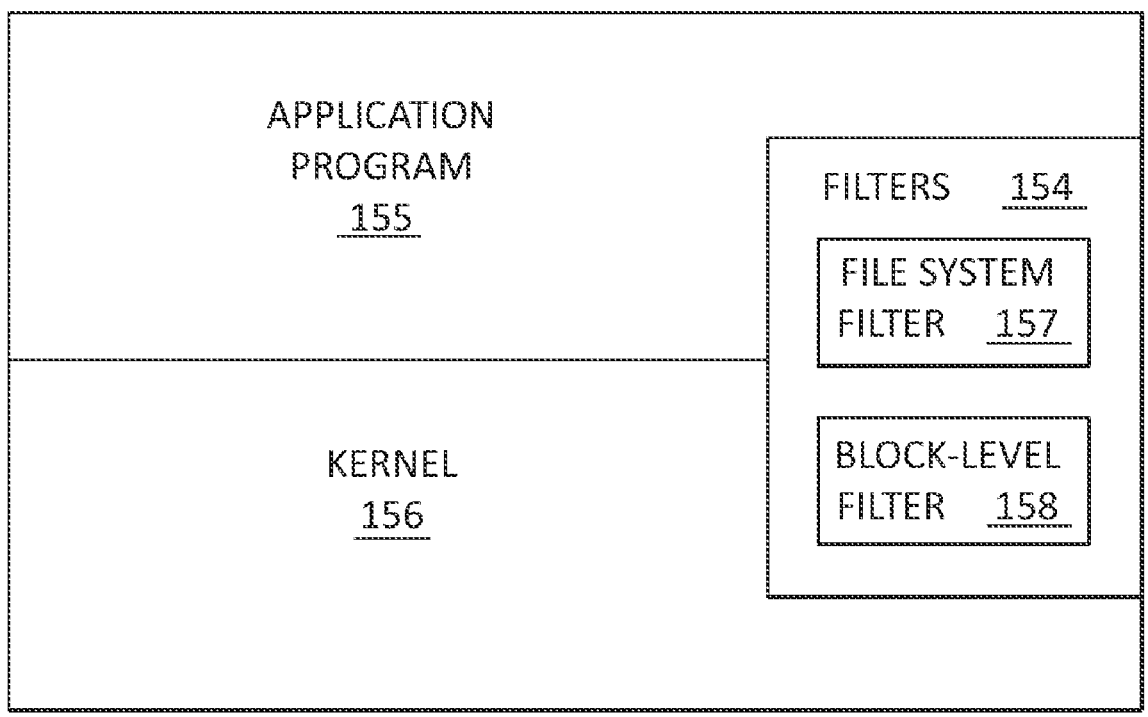
FIG. 1D depicts an exemplary relationship between software components in a data processing system and two filter mechanisms including a file system filter driver and a block level filter driver.

With reference now to FIG. 1D, a simple block diagram depicts an exemplary relationship between software components in a data processing system. Kernel 156 and application program 155 operate in conjunction with a filters module 154. Filters module 154 includes at least two filter drivers (modules), a file system filter driver 157 and a block level filter driver 158. Both filters module 154 and application program 155 use kernel 156, which comprises and/or supports system-level calls, utilities, and device drivers. The file system filter driver may additionally be a record level filter driver 157. In the case of a file system filter driver 157, the driver 157 is attached or "hooked" to the OS file level storage layer as will be further described. In the case of a record level filter driver 157, the driver 157 is attached to a database application program 155. The driver 157 intercepts file level and/or data base level write operations.

The block level filter driver 158 is attached or hooked to the OS in the block storage layer (either volume or disk). The filter 158 performs a secondary interception process to all write operations by intercepting the data in the block level writes layer. The functionality of file system filter driver 157 and block level filter driver 158 will be described further in FIG. 2, following.

Figure 2:
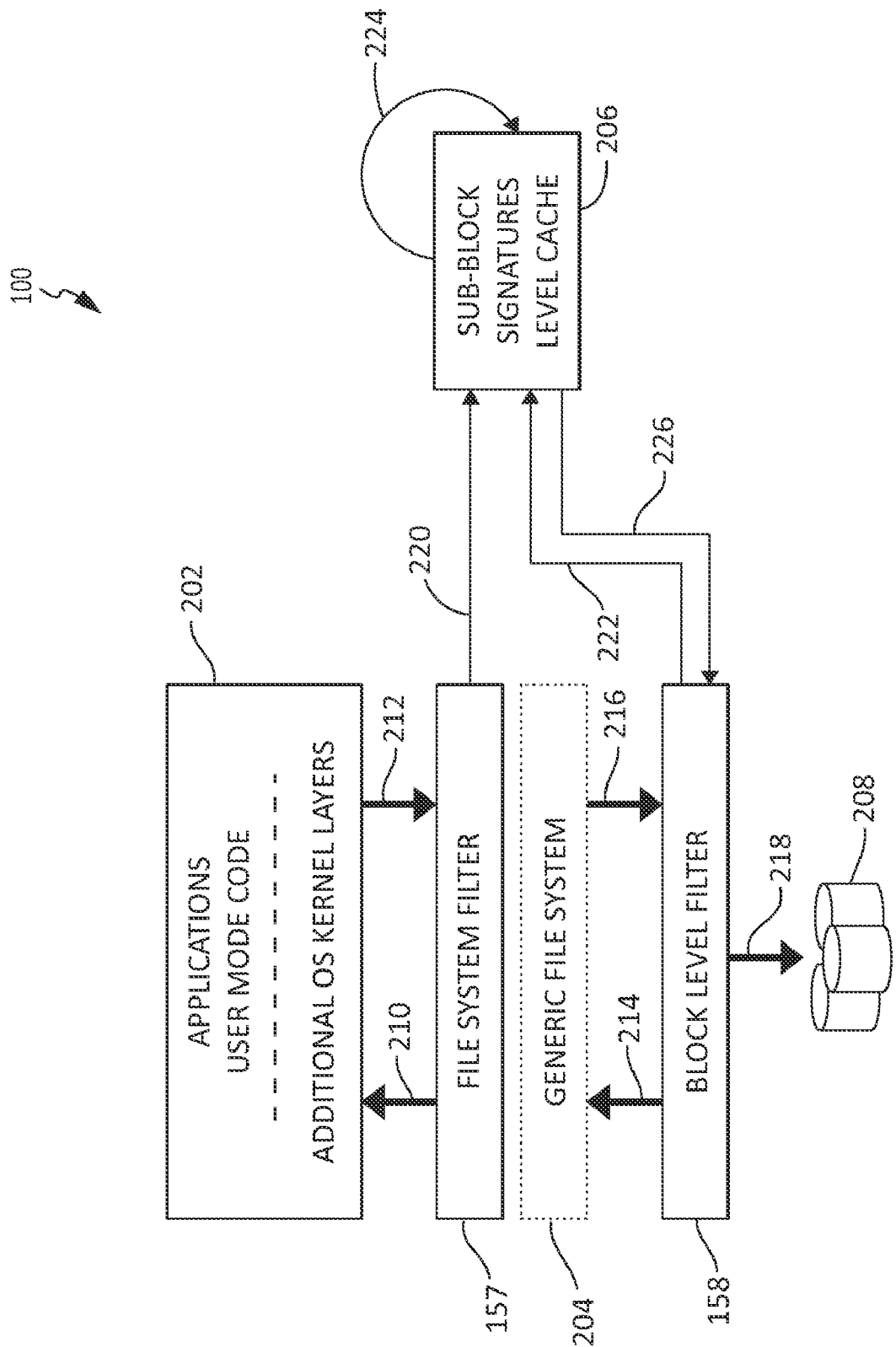
FIG. 2 depicts an exemplary mechanism for block level tagging with file level information using data processing components previously depicted.

FIG. 2 illustrates an exemplary mechanism for block level tagging with file level information using data processing components previously depicted. Structures previously illustrated such as application program 155 and kernel 156 (FIG. 1D) are incorporated into block 202, which illustrates various applications in the applications layer (Ring 3, FIG. 1C) as well as additional OS layers. File level filter 157 is attached to the OS file level storage layer (or to the database application) as previously indicated, and intercepts file level or database level write operations indicated by arrow 212. According to configuration, only selected write operations are processed (typically in file system, volume, or data base granularity). All other write operations, and all of the read and other file system operations are handled normally without block level tagging processing. Accordingly, read operations of file chunks pass through the file system filter without data tagging processing as indicated in arrow 210, and read operations of blocks pass through the block level filter without data tagging processing as indicated in arrow 214.

Using the offset, size and data of each write operation, a set of signatures aligned to the beginning of the file system or database object (typically a file) are created. The signatures represent the data chunks of the write operation and are typically created using a signature algorithm common to the skilled artisan. The signatures are created for sub-write data chunks using the file level or record level filter attached to the OS file level storage layer. The signatures are saved in a dedicated memory cache location 206 that holds the signature itself along with relevant file level/record level information that relates to the write operation and to the file system or database object that the data is written into. This step is represented by arrow 220. Following the above interception process, the write operation is sent to the file system layer 204 regularly, to continue the typical process of the write operation in the storage stack.

Block level filter 158 is hooked to the OS in the block storage layer, such as again volume or disk, and performs a secondary interception process to all write operations. This filter intercepts the data in the block level writes layer as represented by arrow 216. A secondary set of signatures is created using the same common signature algorithm, and written to the memory cache location as represented by arrow 222. The signatures are matched to the signatures that were previously kept in the memory cache location 206 (represented by circular arrow 224) and the relevant blocks are tagged with the relevant file system information previously saved by the file system layer filter (represented by arrow 226).

Following the secondary interception process, the block level write operations are sent with the file system tagging information to the storage stack 208 to continue the typical process while allowing filters and drives to make subsequent usage of the tagging information attached to each block (represented by arrow 218). Blocks that do not match any signature are tagged with a static "no-match" information label. The memory cache location 206 for signatures and relevant file system information is recycled both when a match occurs and by a background least recently used process.

Figure 3:
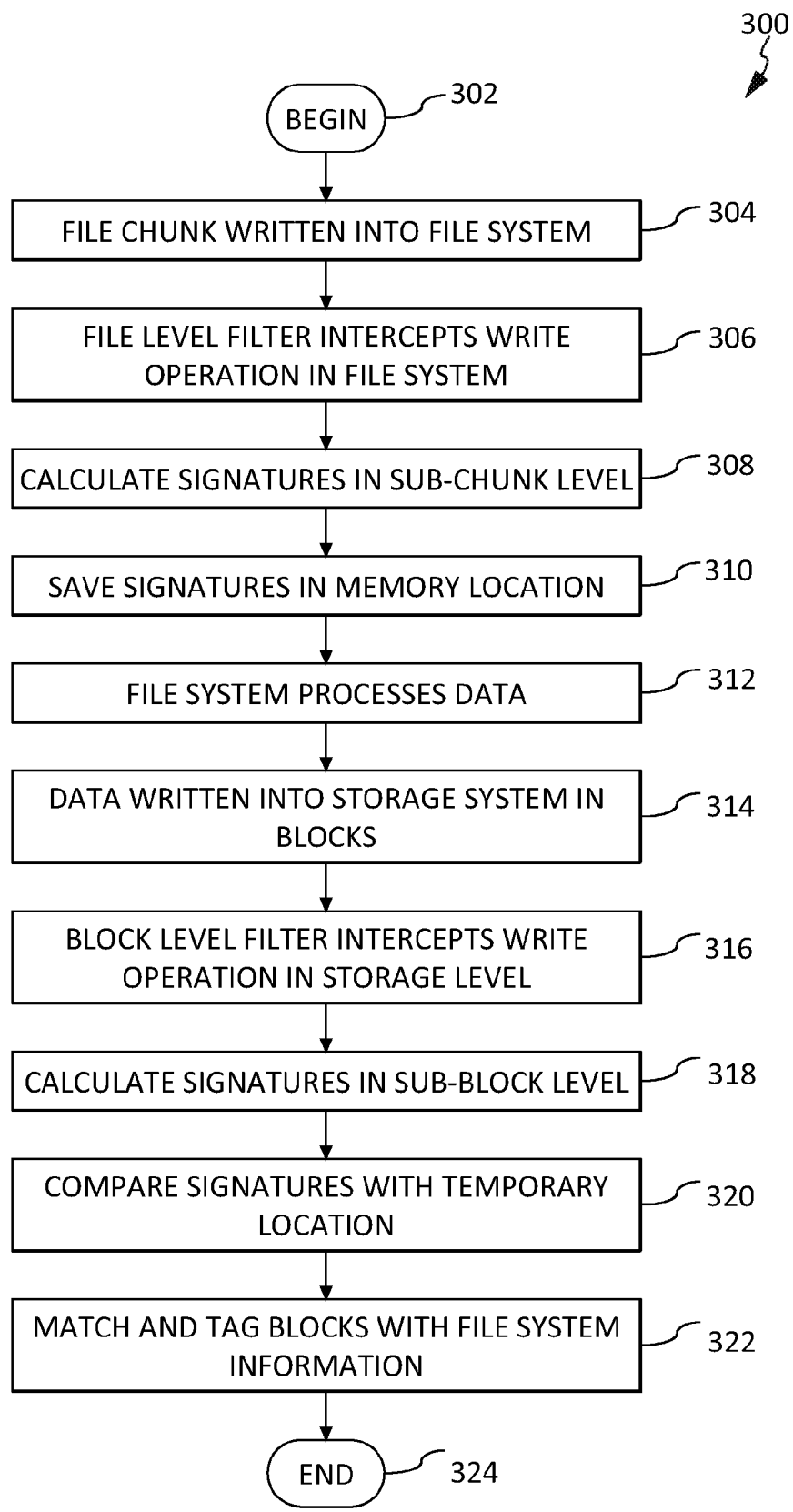
FIG. 3 depicts an exemplary method for block level tagging with file level information.
Figure 4:
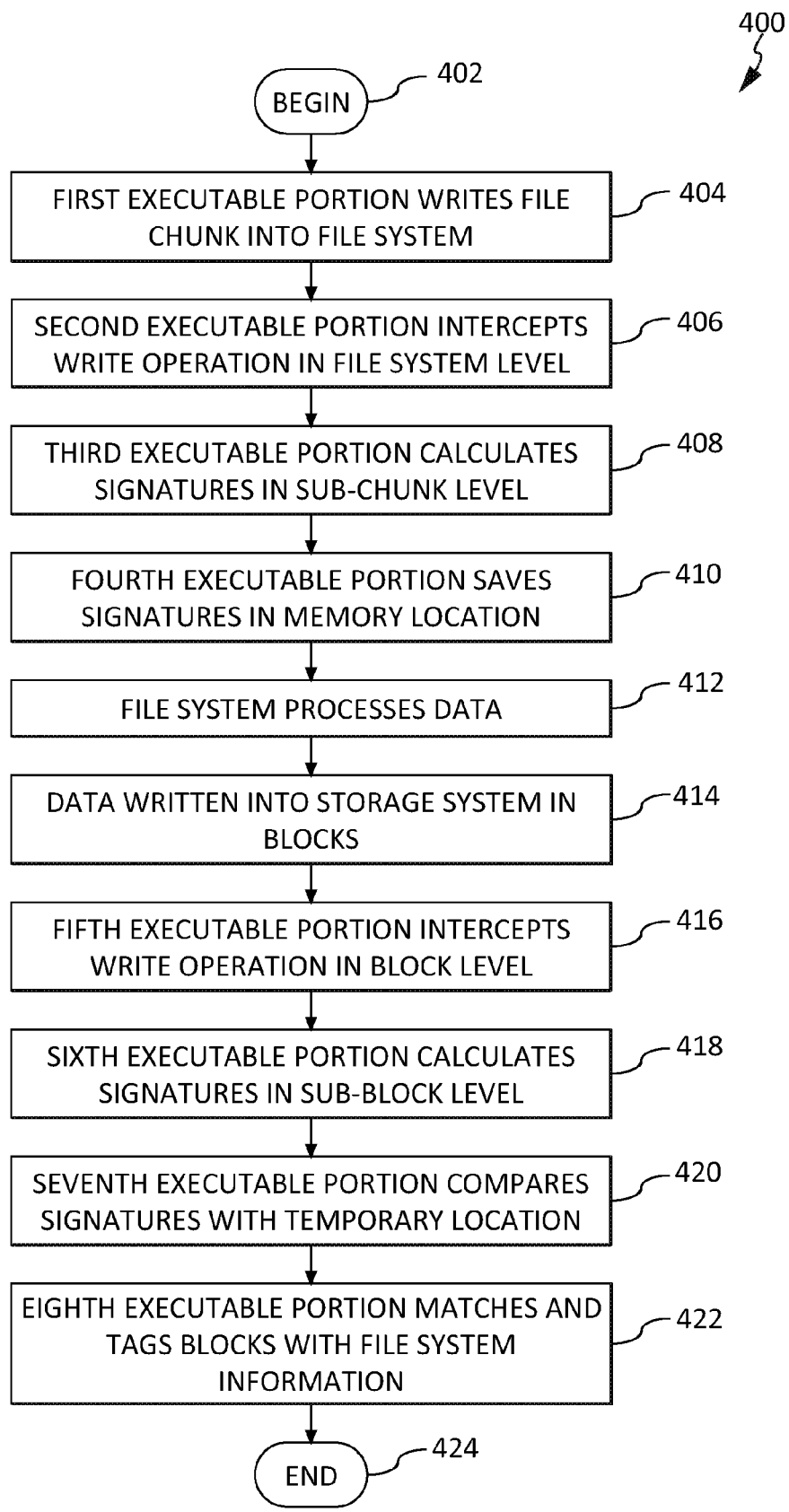
FIG. 4 depicts an additional embodiment of the exemplary method for block level tagging with file level information depicted in FIG. 3 as implemented by a computer program product.

FIG. 3 depicts an exemplary method for block level tagging with file level information, and FIG. 4, following, depicts an additional embodiment of the exemplary method for block level tagging with file level information depicted in FIG. 3 as implemented by a computer program product. As one skilled in the art will appreciate, various steps in the methods may be implemented in differing ways to suit a particular application. In addition, the described methods may be implemented by various means, such as hardware, software, firmware, or a combination thereof operational on or otherwise associated with the computing environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Turning first to FIG. 3, method 300 begins (step 302) with the commencement of a file chunk being written into the computing file system (step 304). The file level filter intercepts the write operation associated with the file chunk in the file system (step 306), and allows other, non-related I/O operations to pass through the filter so as not to receive the later data tagging processing as described previously. A set of signatures aligned to the beginning of the file system object (or database object) is then calculated in the sub-chunk level (step 308). The set of signatures is then saved in a dedicated memory location holding the signature itself along with relevant file level/record level information that relates to the write operation and to the file system or database object that the data is written into (step 310).

Method 300 then moves to step 312, where the file system begins to process the data to be written (step 312). The data is designated to be written into the storage system in block size (step 314). The block level filter intercepts the write operation in the block level storage layer (step 316) by performing a secondary interception process to all write operations to that layer. A secondary set of signatures is created in the sub-block level (step 318). The secondary set of signatures is compared against the signatures originally stored in the designated memory location (step 320). Those data blocks having matching signatures from the original and secondary set are tagged with relevant file system information previously saved by the file system layer filter (step 322). The method 300 then ends (step 324).

Turning now to FIG. 4, method 400 begins (step 402) with a first executable portion of the computer program product writing a file chunk into the file system (step 404). A second executable portion intercepts the write operation in the file system level (step 406). A third executable portion calculates signatures in the sub-chunk level (step 408), and a fourth executable portion saves the signatures in a designated memory location (step 410).

The file system processes the data and prepares to write the data into the storage system in blocks (step 412, 414). As a next step, a fifth executable portion intercepts the write operation in the block level (step 416). A sixth executable portion calculates the secondary set of signatures in the sub-block level (step 418). A seventh executable portion compares the secondary set of signatures against the signatures originally stored in the designated memory location (step 420). Those data blocks having matching signatures from the original and secondary set are tagged with relevant file system information previously saved by the file system layer filter using an eighth executable portion (step 422). The method 400 then ends (step 424).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. In a computing environment, a data tagging method using a processor in communication with a memory device, the method comprising:
   intercepting a first write operation for writing a chunk of data to an operating system (OS) file system level storage layer;
   calculating a set of signatures in a sub-chunk level using a signature algorithm, wherein the set of signatures is aligned to the beginning of one of a OS file system object and OS database object;
   storing the set of signatures in a memory location on the memory device;
   processing the chunk of data so that the chunk of data is written as blocks of data to an OS block level storage layer by a second write operation;
   intercepting the second write operation;
   calculating a secondary set of signatures in a sub-block level, wherein the secondary set of signatures is created using the signature algorithm and is associated with the blocks of data;
   matching the secondary set of signatures and the set of signatures stored in the memory location; and
   tagging each block of data that includes at least one set of signatures that matches at least one secondary set of signatures with file system information relating to the chunk of data.

2. The method of claim 1, wherein the intercepting the first write operation is performed selectively such that additional input/output (I/O) operations not relating to the OS file system level storage layer do not receive data tagging processing.

3. The method of claim 1, wherein the intercepting the first write operation, the calculating the set of signatures, and the storing the set of signatures is performed using a file level filter driver.

4. The method of claim 1, wherein the intercepting the second write operation, the calculating the secondary set of signatures, the matching the secondary set of signatures and the set of signature, and the tagging each block of data is performed using a block level filter driver.

5. The method of claim 1, wherein the storing the set of signatures includes storing the file system information relating to the blocks of the data.

6. The method of claim 1, further including prior to intercepting the first write operation: writing a file chunk into the OS file system level storage layer and writing the blocks of the data into storage.

7. The method of claim 1, further including: sending the blocks of the data tagged with the file system information to a storage stack, and designating blocks of the data having a nonmatching one of the set of signatures and the secondary set of signatures with a static nonmatching information label.

8. A system for data tagging in a computing environment, comprising:
   a processor in communication with a memory device, wherein the processor is adapted for:
      intercepting a first write operation for writing a chunk of data to an operating system (OS) file system level storage layer,
      calculating a set of signatures in a sub-chunk level using a signature algorithm, wherein the set of signatures is aligned to the beginning of one of a OS file system object and OS database object,
      storing the set of signatures in a memory location on the memory device,
      processing the chunk of data so that the chunk of data is written as blocks of data to an OS block level storage layer by a second write operation,
      intercepting the second write operation,
      calculating a secondary set of signatures in a sub-block level, wherein the secondary set of signatures is created using the signature algorithm and is associated with the blocks of data,
      matching the secondary set of signatures and the set of signatures stored in the memory location, and
      tagging each block of data that includes at least one set of signatures that matches at least one secondary set of signatures with file system information relating to the chunk of data.

9. The system of claim 8, wherein the intercepting the first write operation is performed selectively such that additional input/output (I/O) operations not relating to the OS file system level storage layer do not receive data tagging processing.

10. The system of claim 8, wherein the intercepting the first write operation, the calculating the set of signatures, and the storing the set of signatures is performed using a file level filter driver operable by the processor.

11. The system of claim 8, wherein the intercepting the second write operation, the calculating the secondary set of signatures, the matching the secondary set of signatures, and the tagging the blocks of the data is performed using a block level filter driver operable by the processor.

12. The system of claim 8, wherein the processor is further adapted for, during the storing the set of signatures, storing the file system information relating to the blocks of the data.

13. The system of claim 8, wherein the processor is further adapted for, prior to intercepting the first write operation: writing a file chunk into the OS file system level storage layer and writing the blocks of the data into storage.

14. The system of claim 8, wherein the processor is further adapted for: sending the blocks of the data tagged with the file system information to a storage stack, and designating blocks of the data having a nonmatching one of the set of signatures and the secondary set of signatures with a static nonmatching information label.

15. A computer program product for tagging data using a processor in communication with a memory device, the computer program product comprising a non-transitory computer-readable storage medium having computer-readable program code portions stored therein, the computer-readable program code portions comprising:
   a first executable portion for intercepting a first write operation for writing a chunk of data to an operating system (OS) file system level storage layer;

a second executable portion for calculating a set of signatures in a sub-chunk level using a signature algorithm, wherein the set of signatures is aligned to the beginning of one of a OS file system object and OS database object;

a third executable portion for storing the set of signatures in a memory location on the memory device;

a fourth executable portion for processing the chunk of data so that the chunk of data is written as blocks of data to an OS block level storage layer by a second write operation;

a fifth executable portion for intercepting the second write operation;

a sixth executable portion for calculating a secondary set of signatures in a sub-block level, wherein the secondary set of signatures is created using the signature algorithm and is associated with the blocks of data;

a seventh executable portion for matching the secondary set of signatures and the set of signatures stored in the memory location; and a eighth executable portion for tagging each block of data that includes at least one set of signatures that matches at least one secondary set of signatures with file system information relating to the chunk of data.

16. The computer program product of claim 15, wherein the intercepting the first write operation is performed selectively such that additional input/output (I/O) operations not relating to the OS file system level storage layer do not receive data tagging processing.

17. The computer program product of claim 15, wherein the intercepting the first write operation, the calculating the set of signatures, and the storing the set of signatures is performed using a file level filter driver.

18. The computer program product of claim 15, wherein the intercepting the second write operation the calculating the secondary set of signatures, the matching the secondary set of signatures, and the tagging the blocks of the data is performed using a block level filter driver.

19. The computer program product of claim 15, wherein the third executable portion for storing the set of signatures includes a ninth executable portion for storing the file system information relating to the blocks of the data.

20. The computer program product of claim 15, further including a ninth executable portion for: sending the blocks of the data tagged with the file system information to a storage stack, and designating blocks of the data having a nonmatching one of the set of signatures and the secondary set of signatures with a static nonmatching information label.

* * * * *